United States Patent
Naito et al.

(10) Patent No.: US 9,364,820 B2
(45) Date of Patent: Jun. 14, 2016

(54) OXYGEN REDUCTION CATALYST AND ELECTROCHEMICAL CELL

(71) Applicant: KABUSHIKI KAISHA TOSHIBA, Minato-ku, Tokyo (JP)

(72) Inventors: Katsuyuki Naito, Tokyo (JP); Yoshihiko Nakano, Kanagawa (JP); Norihiro Yoshinaga, Kanagawa (JP); Shigeru Matake, Kanagawa (JP); Yoshihiro Akasaka, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 358 days.

(21) Appl. No.: 13/771,729

(22) Filed: Feb. 20, 2013

(65) Prior Publication Data

US 2013/0260286 A1 Oct. 3, 2013

(30) Foreign Application Priority Data

Mar. 30, 2012 (JP) ................. 2012-081928

(51) Int. Cl.

| B01J 31/02 | (2006.01) |
| H01M 4/90 | (2006.01) |
| C25B 9/00 | (2006.01) |
| C25B 11/04 | (2006.01) |
| B01J 31/28 | (2006.01) |
| B01J 31/18 | (2006.01) |

(52) U.S. Cl.
CPC .......... *B01J 31/0255* (2013.01); *B01J 31/0257* (2013.01); *B01J 31/0265* (2013.01); *B01J 31/0267* (2013.01); *B01J 31/28* (2013.01); *C25B 9/00* (2013.01); *C25B 11/04* (2013.01); *H01M 4/9008* (2013.01); *B01J 31/1805* (2013.01); *B01J 2231/62* (2013.01); *B01J 2531/842* (2013.01); *B01J 2531/845* (2013.01)

(58) Field of Classification Search
CPC ............... H01M 4/9008; B01J 31/0257; B01J 31/0265; B01J 31/0267
USPC ......................................... 429/531; 502/167
See application file for complete search history.

(56) References Cited

U.S. PATENT DOCUMENTS

2011/0260119 A1\* 10/2011 Zelenay et al. ............... 252/513
2012/0241315 A1 9/2012 Yoshinaga et al.

FOREIGN PATENT DOCUMENTS

| JP | 2010-221126 | 10/2010 |
| JP | 2012-066225 | 4/2012 |

OTHER PUBLICATIONS

Choi, Chang Hyuk, Min Wook Chung, Han Chang Kwon, Sung Hyeon Park, and Seong Ihl Woo. "B, N- and P, N-doped Graphene as Highly Active Catalysts for Oxygen Reduction Reactions in Acidic Media." Journal of Materials Chemistry A 1.11 (2013): 3694.\*
Office Action of Notification of Reason(s) for Refusal for Japanese Patent Application No. 2012-081928 Dated Jul. 29, 2014, 3 pgs.
Qu et al, Nitrogen-Doped Graphene as Efficient Metal-Free Electrocatalyst for Oxygen Reduction in Fuel Cells, ACS Nano, vol. 4, No. 3, 2010, pp. 1321-1326.
Gong et al, Nitrogen-Doped Carbon Nanotube Arrays with High Electrocatalytic Activity for Oxygen Reduction, Science, vol. 323, No. 5915, 2009, pp. 760-764.

\* cited by examiner

*Primary Examiner* — James Lee

(74) *Attorney, Agent, or Firm* — Amin, Turocy & Watson LLP; Gregory Turocy

(57) ABSTRACT

An oxygen reduction catalyst of an embodiment includes: a stack of single-layer graphenes; and a phosphorus compound, wherein some of carbon atoms of the graphenes are replaced by nitrogen atoms, and the phosphorus compound has a peak of phosphorus $2p$ orbital of 133.0 to 134.5 eV in X-ray photoelectron spectrum.

17 Claims, 3 Drawing Sheets

OXYGEN REDUCTION CATALYST AND ELECTROCHEMICAL CELL

CROSS-REFERENCE TO RELATED APPLICATION

This application is based upon and claims the benefit of priority from Japanese Patent Applications No. 2012-081928, filed on Mar. 30, 2012; the entire contents of which are incorporated herein by reference.

FIELD

Embodiments described herein relate generally to an oxygen reduction catalyst and an electrochemical cell.

BACKGROUND

Conventionally, it has been known that a carbon material, carbon atoms of which are partially replaced by nitrogen atoms serves as an oxygen reduction catalyst in a fuel cell or the like. A carbon oxygen reduction catalyst in which a precious metal such as platinum is supported by a carbon material has been widely used. An oxidization condition with a high potential would easily cause carbon corrosion in the oxygen reduction catalyst including such a carbon material, in which case the activity of the oxygen reduction catalyst easily deteriorates after a long-term operation. As for an oxygen reduction catalyst including metal, it has been known that the introduction of a hetero atom such as oxygen increases the coordination stability of metal.

DETAILED DESCRIPTION

An oxygen reduction catalyst of an embodiment includes: a stack of single-layer graphenes; and a phosphorus compound, wherein some of carbon atoms of the graphenes are replaced by nitrogen atoms, and the phosphorus compound has a peak of phosphorus 2p orbital of 133.0 to 134.5 eV in X-ray photoelectron spectrum.

An electrochemical cell of an embodiment includes: a positive electrode; a negative electrode; a proton conductive film held between the positive electrode and the negative electrode; and a power supply applying voltage to the positive electrode and the negative electrode, wherein the positive electrode or the negative electrode includes an oxygen reduction catalyst including a stack of single-layer graphenes and a phosphorus compound and some of carbon atoms of the graphenes are replaced by nitrogen atoms.

Embodiments of the invention will be described below with reference to the drawings.

Figure 1:
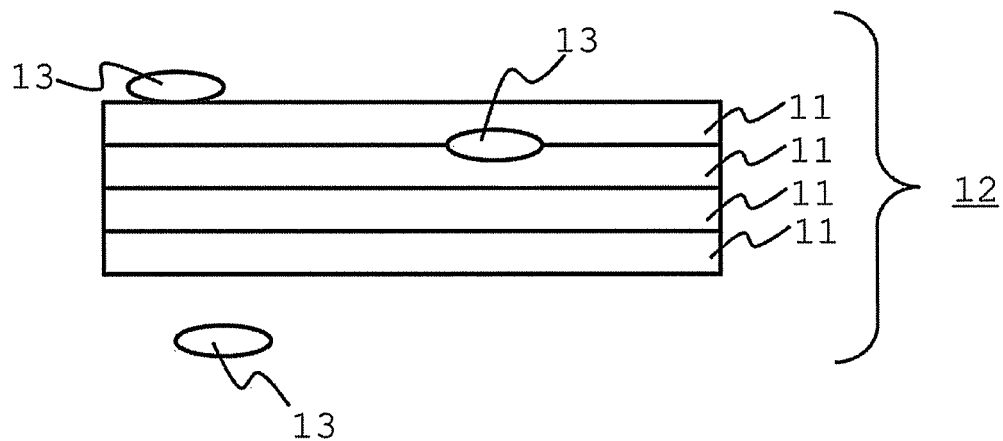
FIG. 1 is a conceptual view of an oxygen reduction catalyst according to an embodiment.

As depicted in the conceptual view of FIG. 1, an oxygen reduction catalyst according to an embodiment includes a multilayer graphene 12 including a stack of single-layer graphenes 11, and a phosphorus compound 13 or another metal between the layers of the multilayer graphene 12, on a surface of the multilayer graphene 12, or independently from the multilayer graphene 12.

Figure 2:
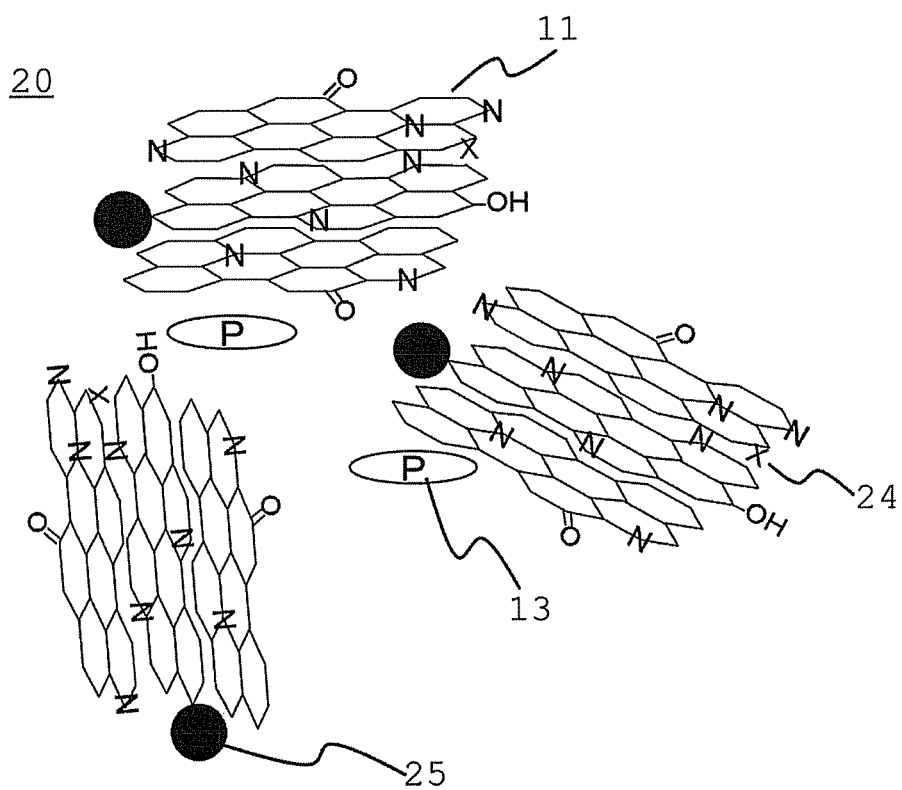
FIG. 2 is a schematic view including anatomic structure of an oxygen reduction catalyst according to an embodiment.

FIG. 2 is a schematic view depicting an example of an atomic structure 20 of the oxygen reduction catalyst. A carbon atom of a part of a skeleton of the single-layer graphene 11 is replaced by a nitrogen atom. Moreover, a carbon atom of a part of a skeleton of the single-layer graphene 11 is coupled with an oxygen atom. The oxygen reduction catalyst contains the phosphorus compound 13. In some cases, the oxygen reduction catalyst contains a metal ion 24 or a metal particle 25. The reference symbol of each component is hereinafter omitted unless the drawing is referred to.

Some carbon atoms of the planar single-layer graphene are replaced by nitrogen atoms. The replacement types of a nitrogen atom are classified into quaternary nitrogen, pyridine nitrogen, pyrrole•pyridone nitrogen, and nitrogen coupled with oxygen.

As for the replacement amount of the carbon atoms with the nitrogen atoms, the amount of the nitrogen atoms relative to the carbon atoms is preferably 0.1 atom % or more and 30 atom % or less. The nitrogen replacement amount below this lower limit would make the catalyst activity small, which is not preferable. In contrast, the nitrogen replacement amount over this upper limit would disturb the graphene structure, resulting in the increase in electric resistance, which is not preferable.

The oxygen atom is coupled with some carbon atoms of the graphenes. Since the oxygen atom is contained in the graphenes, the influence of the long-term deterioration due to an oxygen molecule or the like after the manufacture of the oxygen reduction catalyst can be reduced. The coupling modes of the oxygen atom with the carbon atom include ether oxygen, ketone oxygen, alcohol oxygen, phenol oxygen, carboxylic acid oxygen, and the like. In some cases, the oxygen atom is contained in the phosphorus compound, or contained therein as a metal oxide.

As for the introduction amount of the oxygen atoms, the amount of the oxygen atoms relative to the carbon atoms is preferably 5 atom % or more and 100 atom % or less. The amount of the oxygen atoms below this lower limit would cause the catalyst activity to vary largely with respect to the oxygen. In contrast, the amount of the oxygen atoms over this upper limit would increase the electric resistance and increase the hydrophilic property, resulting in that the interruption of air diffusion called a flooding phenomenon easily occurs.

As the phosphorus compound of the oxygen reduction catalyst according to an embodiment, at least pyrophosphate or polyphosphate is included as oligophosphate. As an alternative to these phosphates, phosphonium salt or orthophosphate as monophosphate may be included. The oligophosphate or polyphosphate is a stable molecule without having too high oxidizing power like diphosphorus pentoxide. Oligophosphate and polyphosphate are preferable from the viewpoint of preventing the deterioration of the oxygen reduction catalyst because they are difficult to release electrons and are expected to have the properties for trapping unpaired electrons such as radicals generated in the oxygen reduction catalyst or the like. The oligophosphate and polyphosphate exist on the single-layer graphene, between the layers of the multilayer graphene, or an edge thereof, for example, and trap a deterioration factor such as a radical generated in the catalyst.

In order to determine whether the phosphorus compounds contained in the oxygen reduction catalyst include a phosphorus compound that contributes to the deterioration prevention of the oxygen reduction catalyst, the X-ray photoelectron spectroscopy (XPS) may be used for measuring the energy necessary for the electron release from the compound.

Figure 3:
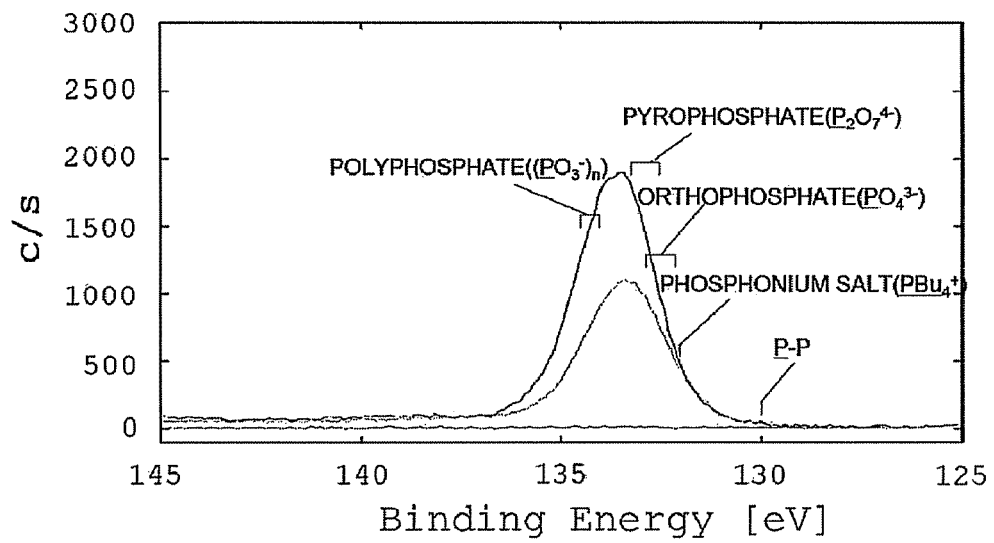
FIG. 3 is an XPS spectrum diagram of phosphorus 2p orbital of an oxygen reduction catalyst according to an embodiment.

FIG. 3 is a spectrum diagram of a phosphorus 2p orbital obtained by measuring the oxygen reduction catalyst according to an embodiment with XPS using tetra-n-butylphosphonium bromide as a reference. A phosphorus atom of tetra-butylphosphonium bromide used as the reference has a peak of phosphorus 2p orbital at 132.0 eV. The oxygen reduction catalyst according to an embodiment has a peak of phosphorus 2p orbital at 132.0 to 133.0 eV due to orthophosphate, a peak of phosphorus 2p orbital at 132.6 to 133.3 eV due to pyrophosphate as the oligophosphate obtained by bimolecular condensation of orthophosphate, and a peak of phosphorus 2p orbital at 134.0 to 134.5 eV due to polyphosphate.

For the XPS, for example, Quantum-2000 manufactured by PHI is used, single-crystal spectroscopy AlKα ray is used as an X-ray source, the output is 40 W, a region to be analyzed has a diameter of 200 μm, the pass energy is −187.85 eV (1.60 eV/Step) in Wide Scan and −58.70 eV (0.125 eV/Step) in Narrow Scan, and $Ar^+$ and $e^-$ are both used as a charge neutralizing gun, and the geometry θ is set at 45° (θ is the angle between a surface of a sample and a detector). For preventing the measurement sample from being charged, conduction is performed with a conductive tape or the like as necessary.

It is understood that the oxygen reduction catalyst of this embodiment has a wide peak on a high energy side of phosphorus 2p corresponding to the range from pyrophosphate to polyphosphate. The wide peak range of the high energy is shifted to the high energy side from the peak of the phosphorus 2p orbital of tetra-n-butylphosphonium bromide by 1.0 eV or more and 2.5 eV or less. This indicates that the phosphorus according to an embodiment easily causes an electron to polarize toward the coupled oxygen as compared with tetra-n-butylphosphonium bromide, so that an electron from a phosphorus atom is difficult to be released. Such a phosphorus atom with high energy is expected to have the property for trapping an unpaired electron such as a radical.

Diphosphorus pentoxide which is more difficult to release an electron has a peak of 2p orbital of phosphorus at 135.2 eV according to the same measurement but diphosphorus pentoxide is instable because of having too high oxidation power. It is considered that orthophosphate does not have that high capability of trapping the unpaired electron such as a radical.

The electron release energy of the phosphorus 2p orbital in the case where phosphorus is introduced to the graphene skeleton is generally lower than that of oligophosphate or polyphosphate.

The oxygen reduction catalyst according to this embodiment may contain metal or its ion. In this case, the metal is preferably iron or cobalt. When iron or cobalt is contained, graphitization is promoted at the time of manufacture of the oxygen reduction catalyst, resulting in that the durability of the oxygen reduction catalyst is further increased. When an ion of iron or cobalt is contained, the graphene structure is stabilized through coordination with the nitrogen atom in the oxygen reduction catalyst. It is considered that, when metal exists, a part of the metal is ionized during the operation.

The oxygen reduction catalyst according to an embodiment may contain a platinum particle. In the case of using a platinum particle, the oxygen reduction catalyst of the embodiment supports platinum. The size of the platinum particle may be, for example, 1 nm or more and 30 nm or less, which is the size of the particle used as the normal oxygen reduction catalyst. By addition of platinum of 0.1 wt % or more to the oxygen reduction catalyst, even if it is a very small amount, the activity of the entire oxygen reduction catalyst can be improved by the added platinum. Moreover, since oxygen for suppressing carbon corrosion is introduced to the graphene in advance, desorption of platinum from the support can be prevented; thus, the amount of usage of platinum can be suppressed. Since the desorption of platinum is difficult, the addition amount of platinum can be suppressed.

Figure 4:
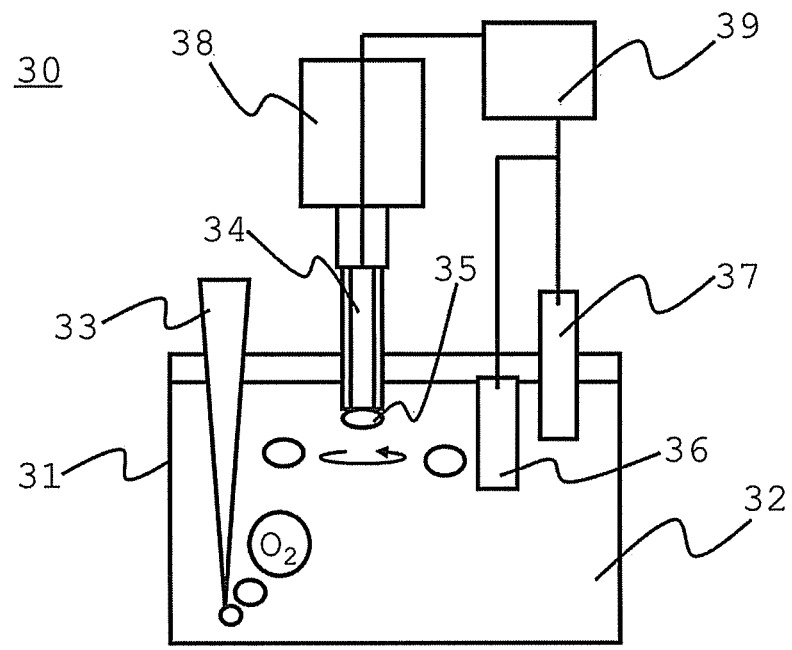
FIG. 4 is a conceptual view of a device for testing the durability of an oxygen reduction catalyst according to an embodiment.

Next, the durability test for the oxygen reduction catalyst according to this embodiment is explained. FIG. 4 is a conceptual view of a method of the durability test for the oxygen reduction catalyst according to this embodiment. The durability test is performed with reference to the method of testing the durability of the carbon-supported platinum oxygen reduction catalyst for a fuel cell described in the 2009 NEDO result report, or the like. In a flask 31, 0.5 M-sulfuric acid solution 32 is poured and oxygen from an oxygen gas introduction part 33 is bubbled. On a rotation disk electrode of glassy carbon 34, slurry of an oxygen reduction catalyst 35 is applied and dried, and then a Nafion solution is dropped and dried thereon. This electrode 34 is used as a working electrode. A carbon electrode 36 is used as a counter electrode, and a silver/silver chloride electrode 37 is used as a reference electrode. The glassy carbon electrode 34 is rotated by a motor 38. Each electrode is connected to a potentiostat 39.

For mainly observing the deterioration due to carbon corrosion, a start-stop type deterioration test in which a triangular wave (6 seconds in one cycle) is applied in the range of 0.9 to 1.3 V is performed. Moreover, for mainly observing the deterioration due to the dissolution of platinum or the like, a load variation type deterioration test in which a triangular wave (4 seconds in one cycle) is applied in the range of 0.6 to 0.9 V is performed; however, carbon corrosion proceeds even in this potential range. Chronoamperometry measurement at potential of 0.71 V is performed with a rotation speed of 2500 per minute for around 1000 cycles; thus, oxygen reduction current after 10 minutes is measured. The current value before the cycle is set as $I_0$ and the current value after 1000 cycles is set as $I_{1000}$. The deterioration ratio (%) is obtained by $[I_0 - I_{1000}]/[I_0] \times 100$.

The carbon corrosion is caused by oxidation of carbon due to the high potential, and it is considered that its reaction is caused by a radical. In the oxygen reduction catalyst according to this embodiment including the graphene skeleton in which at least a part of the carbon atoms is replaced by the nitrogen atom, the oxygen atom and the phosphorus atom are included. The peak of phosphorus 2p orbital is 133.0 to 134.5 eV or is shifted by 1.0 to 2.5 eV toward the high energy side from the peak of phosphorus 2p orbital of tetra-n-butylphosphonium bromide according to the X-ray photoelectron spectrum. Since the phosphorus with such high stability is contained, a radical can be trapped to delay the deterioration of the oxygen reduction catalyst activity due to the carbon corrosion, which contributes to the longer life. Since the graphene contains the oxygen atom in advance, many of parts that are sensitive to oxygen are already oxidized; therefore, the oxygen reduction catalyst can prevent sudden characteristic deterioration in oxygen.

Next, a manufacturing method for the oxygen reduction catalyst of this embodiment is described.

As the manufacturing method for the oxygen reduction catalyst of this embodiment, a method of mixing a phosphorus compound and at least any of graphene oxide treated with hydrazine or ammonia, nitrogen-containing polymer, a nitrogen-containing metal compound and polymer and then sintering the mixture is given. Out of the materials described below, two kinds or more may be mixed to be used.

As the graphene oxide, the one obtained by oxidizing graphite, carbon nanotube, carbon nanofiber, carbon nanohorn, or the like can be used.

As the hydrazine or ammonia treatment performed on the graphene oxide, the treatment in which heating treatment for an hour at approximately 80° C. is performed in a hydrazine or ammonia gas phase or after hydrazine or ammonia is applied or jetted to the graphene oxide, the treatment in which heating treatment is performed after hydrazine or ammonia is added to a water dispersion liquid of the graphene oxide, and the like are given. These kinds of treatment may be combined. The nitride and the treatment method are not limited to the above description as long as equivalent operation effects can be obtained.

As the nitrogen-containing polymer, for example, a melamine resin, a guanamine resin, a benzoguanamine resin, a urine resin, polyacrylonitrile, polyaniline, polyphenylene diamine, or the like is given.

As the nitrogen-containing metal compound, a compound including iron or cobalt is preferable; for example, iron phthalocyanine, cobalt phthalocyanine, iron porphyrin, cobalt porphyrin, or the like is given.

As the polymer, aromatic polymer is preferable; for example, polyfurfuryl alcohol, polyparaphenylene, phenol formaldehyde resin, or the like is given.

As the phosphorus compound, for example, triphenyl phosphine, a phosphazene derivative, phosphate, polyphosphate, or the like is given.

The sintered product may be mixed with a metal compound. The metal compound may be, for example, iron sulfate, cobalt sulfate, iron chloride, cobalt chloride, iron phthalocyanine, cobalt phthalocyanine, or the like.

For making the phosphorus compound oligophosphate or polyphosphate, a small amount of oxygen is necessary. Oxygen is also necessary for coupling the graphene carbon with oxygen. A very small amount of oxygen contained in the nitrogen or argon air flow supplied at the time of sintering is enough for the necessary oxygen, but oxygen may be further contained in the polymer, the metal compound, or the phosphorus compound. In the case where a reductive gas such as hydrogen or ammonia is contained in the air flow, it is more preferable that oxygen be contained in the polymer, the metal compound, or the phosphorous compound.

The mixing is performed by, for example, using a solvent such as THF and performing heating and mixing, removing the solvent, and bruising the resulting residue in a mortar, thereby adjusting the particle diameter.

The sintering can be performed in nitrogen or argon at 600° C. or more and 1100° C. or less. The sintering atmosphere preferably contains ammonia because more nitrogen atoms can be introduced. In the case where a very large amount of oxygen atoms are contained in the raw material, hydrogen is preferably contained because the oxygen amount can be controlled as appropriate.

Figure 5:
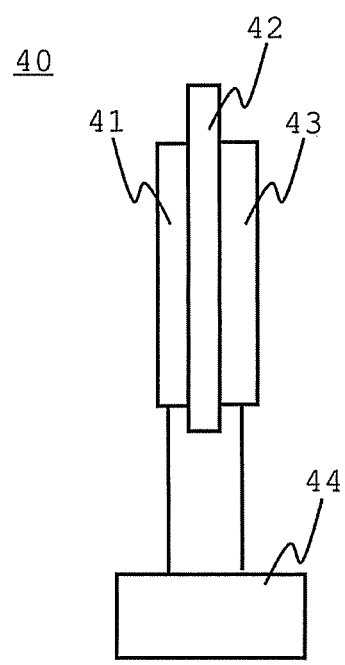
FIG. 5 is a conceptual view of an electrochemical cell including an oxygen reduction catalyst according to an embodiment for a positive electrode or a negatibe electrode.

FIG. 5 is a conceptual view of a sectional structure of an electrochemical cell 40 according to this embodiment. A positive electrode 41 or a negative electrode 43 includes the oxygen reduction catalyst according to this embodiment. A proton conductive film denoted by 42 is held between the positive electrode 41 and the negative electrode 43. The positive electrode 41 and the negative electrode 43 are connected to an external electric circuit 44 for applying voltage to the electrodes.

Since the electrochemical cell according to this embodiment includes the oxygen reduction catalyst of the embodiment for the positive electrode or the negative electrode, the electrochemical cell that is stable and highly active can be provided.

The electrochemical cell according to this embodiment is preferably used for a fuel cell. In particular, in the fuel cell for automobiles, start-stop often occurs; the carbon corrosion is a significant problem. The use of the present oxygen reduction catalyst, however, can provide the long-life fuel cell.

The electrochemical cell according to this embodiment is preferably used for an oxygen-reducing cell or a dehumidifying cell. In the oxygen-reducing cell or the dehumidifying cell, voltage is applied to the positive electrode to decompose water, thereby generating oxygen, proton, and electrons and voltage is applied to the negative electrode to generate water from oxygen, proton, and electrons. The proton is transported to the negative electrode through an electrolyte film. In the negative electrode, water is generated from proton, oxygen, and electrons. By utilizing the operation of one of the electrodes, the use as the oxygen-reducing cell or the dehumidifying cell is achieved. The reaction for generating water and the reaction for generating hydrogen (proton) occur competitively; the carbon oxygen reduction catalyst can suppress the hydrogen generation and, in the case of using platinum, suppress the hydrogen generation because the necessary amount of platinum is very small. When the drive voltage is increased along with the deterioration, the deterioration is further accelerated and hydrogen is more easily generated; however, the electrochemical cell of this embodiment can have longer life.

More specific description is hereinafter made with examples.

EXAMPLE 1

In 150 ml of THF, 10 g of butylated melamine resin as the nitrogen-containing polymer, 2 g of iron (II) sulfate as the metal compound, and 1.0 g of triphenyl phosphine as the phosphorus compound are heated and mixed. The THF is distilled away and vacuum dry is performed. The resulting residue is bruised in a mortar and sintered under argon for an hour at 800° C., thereby providing 2.6 g of an oxygen reduction catalyst.

According to the XPS measurement of the oxygen reduction catalyst, the peak of phosphorus 2p orbital is observed at 133.2 eV. With respect to the carbon atoms, 13% of nitrogen atoms, 41% of oxygen atoms, 1.0% of phosphorus atoms, and 9% of iron atoms are observed. After the oxygen reduction catalyst is dispersed in ethanol/water, the solution is applied to a rotation disk electrode of glassy carbon and the similar durability test is performed using the device of FIG. 3. For observing the deterioration due to the carbon corrosion, the triangular wave is applied in the range of 0.9 to 1.3 V, thereby performing the durability test. The deterioration ratio is approximately 5%. The triangular wave is applied in the range of 0.6 to 0.9 V, thereby performing the durability test. The deterioration ratio is approximately 9%.

COMPARATIVE EXAMPLE 1

In a manner similar to the example 1 except that triphenyl phosphine is not used, 2.1 g of the oxygen reduction catalyst is synthesized. For observing the deterioration due to the carbon corrosion, the triangular wave is applied in the range of 0.9 to 1.3 V, thereby performing the similar durability test. The deterioration ratio is approximately 40%. The triangular wave is applied in the range of 0.6 to 0.9 V, thereby performing the durability test. The deterioration ratio is approximately 7%. This indicates that the oxygen reduction catalyst according to the comparative example 1 is extremely vulnerable to the carbon corrosion as compared with the example 1.

EXAMPLE 2

In 150 ml of THF, 5 g of butylated melamine resin as the nitrogen-containing polymer, 2 g of iron (II) sulfate as the metal compound, and 5 g of a phosphazene compound (SPH-100 manufactured by Otsuka Pharmaceutical Co., Ltd) as the nitrogen-containing phosphorus compound are heated and mixed. The THF is distilled away and vacuum dry is performed. The resulting residue is bruised in a mortar and sintered under argon for an hour at 800° C., thereby providing 4.9 g of an oxygen reduction catalyst.

According to the XPS measurement of the oxygen reduction catalyst, the peak of phosphorus 2p orbital is observed at 133.6 eV. With respect to the carbon atoms, 8% of nitrogen atoms, 73% of oxygen atoms, 13% of phosphorus atoms, and 11% of iron atoms are observed. After the oxygen reduction catalyst is dispersed in ethanol/water, the solution is applied to a rotation disk electrode of glassy carbon and the similar durability test is performed using the device of FIG. 3. For observing the deterioration due to the carbon corrosion, the triangular wave is applied in the range of 0.9 to 1.3 V, thereby performing the durability test. The deterioration ratio is approximately 3%. Moreover, the triangular wave is applied in the range of 0.6 to 0.9 V, thereby performing the durability test. The deterioration ratio is approximately 7%.

EXAMPLE 3

In 150 ml of THF, 5 g of butylated melamine resin as the nitrogen-containing polymer, 2 g of iron (II) sulfate as the metal compound, and 5 g of a phosphazene compound (SPH-100 manufactured by Otsuka Pharmaceutical Co., Ltd) as the nitrogen-containing phosphorus compound are heated and mixed. The THF is distilled away and vacuum dry is performed. The resulting residue is bruised in a mortar, sintered under argon for an hour at 800° C., washed with sulfuric acid and pure water, and dried, thereby providing 3.4 g of an oxygen reduction catalyst. Next, 0.1 g of sodium tetrachloroplatinate (II) tetrahydrate and 0.2 g of the above oxygen reduction catalyst are added to 40 mL of ethylene glycol. While the solution is stirred, 0.2 g of sodium borohydride is added and the solution is stirred for 4 hours at 65° C. To the solution, 30 mL of 0.2 M-hydrochloric aqueous solution is added and the solution is stirred for 3 hours. Then, the solution is filtered to separate out the precipitate, and washed with distilled water to provide the platinum-supported oxygen reduction catalyst.

According to the XPS measurement of the oxygen reduction catalyst, the peak of phosphorus 2p orbital is observed at 133.4 eV. With respect to the carbon atoms, 8% of nitrogen atoms, 34% of oxygen atoms, 5% of phosphorus atoms, 2% of iron atoms, and 1% of platinum atoms are observed. After the oxygen reduction catalyst is dispersed in ethanol/water, the solution is applied to a rotation disk electrode of glassy carbon and the similar durability test is performed using the device of FIG. 3. For observing the deterioration due to the carbon corrosion, the triangular wave is applied in the range of 0.9 to 1.3 V, thereby performing the durability test. The deterioration ratio is approximately 2%. The triangular wave is applied in the range of 0.6 to 0.9V, thereby performing the durability test. The deterioration ratio is approximately 10%.

COMPARATIVE EXAMPLE 2

The durability test is performed using a commercially available carbon-supported platinum oxygen reduction catalyst (TEC10E50E-HT, manufactured by TANAKA HOLDING Co., Ltd.) as the oxygen reduction catalyst. For observing the deterioration due to the carbon corrosion, the triangular wave is applied in the range of 0.9 to 1.3 V, thereby performing the similar durability test. The deterioration ratio is approximately 36%. The triangular wave is applied in the range of 0.6 to 0.9 V, thereby performing the durability test. The deterioration ratio is approximately 27%. The catalyst does not contain the phosphorus compound and deteriorates rapidly in the both voltage ranges.

EXAMPLE 4

A fuel cell is manufactured using the oxygen reduction catalyst obtained in the example 1 for a positive electrode. An oxygen reduction catalyst layer in which the oxygen reduction catalyst, carbon nanofiber, and Nafion are mixed is formed on a gas diffusion layer. The support amount of the oxygen reduction catalyst is 5 mg/cm$^2$. As the hydrogen oxidation catalyst on the negative electrode side, TEC10E30E (manufactured by TANAKA HOLDING Co., Ltd.) is used; as an electrolyte film, NRE211CS (manufactured by DuPont) is used. The amount of platinum on the negative electrode side is 0.05 mg/cm$^2$. The positive electrode and the negative electrode are unified with the electrolyte film through thermal compression bonding. A carbon paper is brought into contact as the gas diffusion layer, thereby providing the fuel cell. On the negative electrode side of this fuel cell, hydrogen gas with a humidity of 100% RH is provided; on the positive electrode side, the air with a humidity of 100% RH is provided. Then, the electrochemical reaction is caused in an electronic load device. The obtained fuel cell has excellent start-stop cycle characteristics.

COMPARATIVE EXAMPLE 3

A fuel cell is manufactured in a manner similar to the example 4 except that the oxygen reduction catalyst obtained in the comparative example 1 is used. As for the characteristics of the obtained fuel cell, the deterioration speed is twice or more higher than that of the example 4 until the 100-th start-stop cycle.

EXAMPLE 5

An oxygen-reducing cell is manufactured using the oxygen reduction catalyst obtained in the example 1 for a negative electrode. An oxygen reduction catalyst layer in which the oxygen reduction catalyst, carbon fiber, and Nafion are mixed is formed on a gas diffusion layer. The support amount of the oxygen reduction catalyst is 5 mg/cm$^2$. An iridium oxide water decomposition catalyst is used for a positive electrode, and the support amount is 1 mg/cm$^2$. For an electrolyte film, NRE211CS (manufactured by DuPont) is used. The positive electrode and the negative electrode are unified with the electrolyte film through thermal compression bonding. As the gas diffusion layer, a carbon paper is brought into contact to provide the oxygen-reducing cell. Liquid water is supplied to the positive electrode side of this oxygen-reducing cell, and the negative electrode side thereof is connected to the closed space of 10 L; then, the operation is conducted at a current density of 0.1 A/cm$^2$ to reduce the oxygen concentration of the closed space down to 15%. After that, the external air is introduced to return the oxygen concentration. The obtained oxygen-reducing cell also has excellent operation cycle characteristics.

COMPARATIVE EXAMPLE 4

An oxygen-reducing cell is manufactured in a manner similar to the example 5 except that the oxygen reduction catalyst obtained in the comparative example 1 is used. As for the characteristics of the obtained oxygen reducing cell, the deterioration speed is twice or more higher than that of the example 5 until the 100-th start-stop cycle.

EXAMPLE 6

A dehumidifying cell is manufactured using the oxygen reduction catalyst obtained in the example 1 for a negative electrode. An oxygen reduction catalyst layer in which the oxygen reduction catalyst, carbon fiber, and Nafion are mixed is formed on a gas diffusion layer. The support amount of the oxygen reduction catalyst is 5 mg/cm$^2$. Indium oxide is used for a positive electrode, and NRE211CS (manufactured by DuPont) is used for an electrolyte film. The positive electrode and the negative electrode are unified with the electrolytic film through thermal compression bonding. As the gas diffusion layer, a carbon paper is brought into contact to provide the dehumidifying cell. The positive electrode side of this dehumidifying cell is connected to the closed space of 10 L; then, the operation is conducted at a current density of 0.02 A/cm$^2$ to reduce the relative humidity of the closed space down to 30%. After that, the air with a relative humidity of 80% is introduced to return the relative humidity. The obtained dehumidifying cell has excellent operation cycle characteristics.

COMPARATIVE EXAMPLE 5

A dehumidifying cell is manufactured in a manner similar to the example 6 except that the oxygen reduction catalyst obtained in the comparative example 1 is used. As for the characteristics of the obtained dehumidifying cell, the deterioration speed is twice or more higher than that of the example 6 until the 100-th start-stop cycle.

EXAMPLE 7

A fuel cell is manufactured using the oxygen reduction catalyst obtained in the example 3 for a positive electrode. An oxygen reduction catalyst layer in which the oxygen reduction catalyst, carbon fiber, and Nafion are mixed is formed on a gas diffusion layer. The support amount of the oxygen reduction catalyst is 5 mg/cm$^2$. As the hydrogen oxidation catalyst on the negative electrode side, TEC10E30E (manufactured by TANAKA HOLDING Co., Ltd.) is used; as an electrolyte film, NRE211CS (manufactured by DuPont) is used. The amount of platinum on the negative electrode side is 0.05 mg/cm$^2$. The positive electrode and the negative electrode are unified with the electrolyte film through thermal compression bonding. A carbon paper is brought into contact as the gas diffusion layer, thereby providing the fuel cell. On the negative electrode side of this fuel cell, hydrogen gas with a humidity of 100% RH is provided; on the positive electrode side, the air with a humidity of 100% RH is provided. Then, the electrochemical reaction is caused in an electronic load device. The obtained fuel cell has a high electromotive force and excellent start-stop cycle characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrochemical cell comprising:
   a positive electrode;
   a negative electrode;
   a proton conductive film held between the positive electrode and the negative electrode; and
   a power supply applying voltage to the positive electrode and the negative electrode, wherein
   the positive electrode or negative electrode includes an oxygen reduction catalyst including a stack of single-layer graphenes and a phosphorus compound,
   some of carbon atoms of the graphenes in which are replaced by nitrogen atoms, and
   the phosphorus compound has a peak of phosphorus 2p orbital of 133.2 to 134.5 eV in X-ray photoelectron spectrum.

2. The cell according to claim 1, wherein the electrochemical cell is for a fuel cell.

3. The cell according to claim 1, wherein the electrochemical cell is for an oxygen-reducing cell or a dehumidifying cell.

4. The cell according to claim 1, wherein the phosphorus compound is oligophosphate or polyphosphate.

5. The cell according to claim 1, further comprising iron or cobalt.

6. The cell according to claim 1, further comprising platinum.

7. An electrochemical cell comprising:
   a positive electrode;
   a negative electrode;
   a proton conductive film held between the positive electrode and the negative electrode; and
   a power supply applying voltage to the positive electrode and the negative electrode, wherein
   the positive electrode or negative electrode includes an oxygen reduction catalyst including a stack of single-layer graphenes and a phosphorus compound,
   some of carbon atoms of the graphenes in which are replaced by nitrogen atoms, and
   a peak of phosphorus 2p orbital of the phosphorus compound is shifted by 1.2 to 2.5 eV toward a high-energy side from a peak of phosphorus 2p orbital of tetra-n-butylphosphonium bromide in X-ray photoelectron spectrum.

8. The cell according to claim 7, wherein the electrochemical cell is for a fuel cell.

9. The cell according to claim 7, wherein the electrochemical cell is for an oxygen-reducing cell or a dehumidifying cell.

10. The cell according to claim 7, wherein the phosphorus compound is oligophosphate or polyphosphate.

11. The cell according to claim 7, further comprising iron or cobalt.

12. The cell according to claim 7, further comprising platinum.

13. An electrochemical cell comprising:
    a positive electrode;
    a negative electrode;
    a proton conductive film held between the positive electrode and the negative electrode; and
    a power supply applying voltage to the positive electrode and the negative electrode, wherein the positive electrode or negative electrode includes an oxygen reduction catalyst including a stack of single-layer graphenes and a phosphorus compound, some of carbon atoms of the graphenes in which are replaced by nitrogen atoms, and the phosphorus compound is oligophosphate or polyphosphate.

14. The cell according to claim 13, wherein the electrochemical cell is for a fuel cell.

15. The cell according to claim 13, wherein the electrochemical cell is for an oxygen-reducing cell or a dehumidifying cell.

16. The cell according to claim 13, further comprising iron or cobalt.

17. The cell according to claim 13, further comprising platinum.

* * * * *